Oct. 6, 1953   E. E. FRAUENHEIM, JR   2,654,691
MALTING APPARATUS
Filed March 14, 1951   7 Sheets-Sheet 3

INVENTOR.
Edward E. Frauenheim, Jr.
BY
Edwin B. Gary
Attorney.

Oct. 6, 1953  E. E. FRAUENHEIM, JR  2,654,691
MALTING APPARATUS

Filed March 14, 1951  7 Sheets-Sheet 4

INVENTOR.
Edward E. Frauenheim, Jr.
BY
Edwin B. Gary
Attorney.

Oct. 6, 1953     E. E. FRAUENHEIM, JR     2,654,691
MALTING APPARATUS

Filed March 14, 1951     7 Sheets—Sheet 6

INVENTOR.
Edward E. Frauenheim, Jr.
BY
Edwin B. Gary
Attorney.

Patented Oct. 6, 1953

2,654,691

UNITED STATES PATENT OFFICE 2,654,691

MALTING APPARATUS

Edward E. Frauenheim, Jr., Eggertsville, N. Y.

Application March 14, 1951, Serial No. 215,468

25 Claims. (Cl. 195—71)

1

This invention relates to improvements in malting apparatus and is also concerned with a method of treating grain to produce malt.

One object of the invention is to provide malting apparatus wherein the grain is uniformly exposed to the aerating action of the air employed so as to insure the production of a uniform, high-grade product.

A further object is to provide apparatus for the purpose described wherein the grain to be germinated is treated successively in a plurality of compartments which are arranged one above another so that turning of the grain from time to time may be effected by permitting the grain to flow by gravity from each compartment to an adjacent compartment therebeneath.

A still further object is to provide apparatus which is so designed that a minimum of power will be required and maintenance costs also minimized.

A still further object is to provide apparatus wherein, in connection with the turning of the grain, the latter is subjected to an action which will separate any grain which has become matted or which may, for other reasons, have adhered together as a mass.

A still further object is to provide apparatus wherein the flow of air through the grain being treated may be reversed in order to insure more thorough aeration of the grain.

A still further object is apparatus wherein provision is made for automatically controlling the temperature of the air which is caused to circulate through the grain.

A still further object is to provide apparatus which is so designed that a portion of the air which has been circulated through the grain may be recirculated.

A still further object is to provide apparatus for automatically controlling the amount of air which is caused to pass through the grain in accordance with the temperature of the grain.

A still further object is a novel design and arrangement of the parts of the apparatus, whereby to insure economy in construction and operation.

A still further object is a novel method of aerating and turning grain for the purpose contemplated.

The invention is illustrated in the accompanying drawings, wherein.

Figure 1:
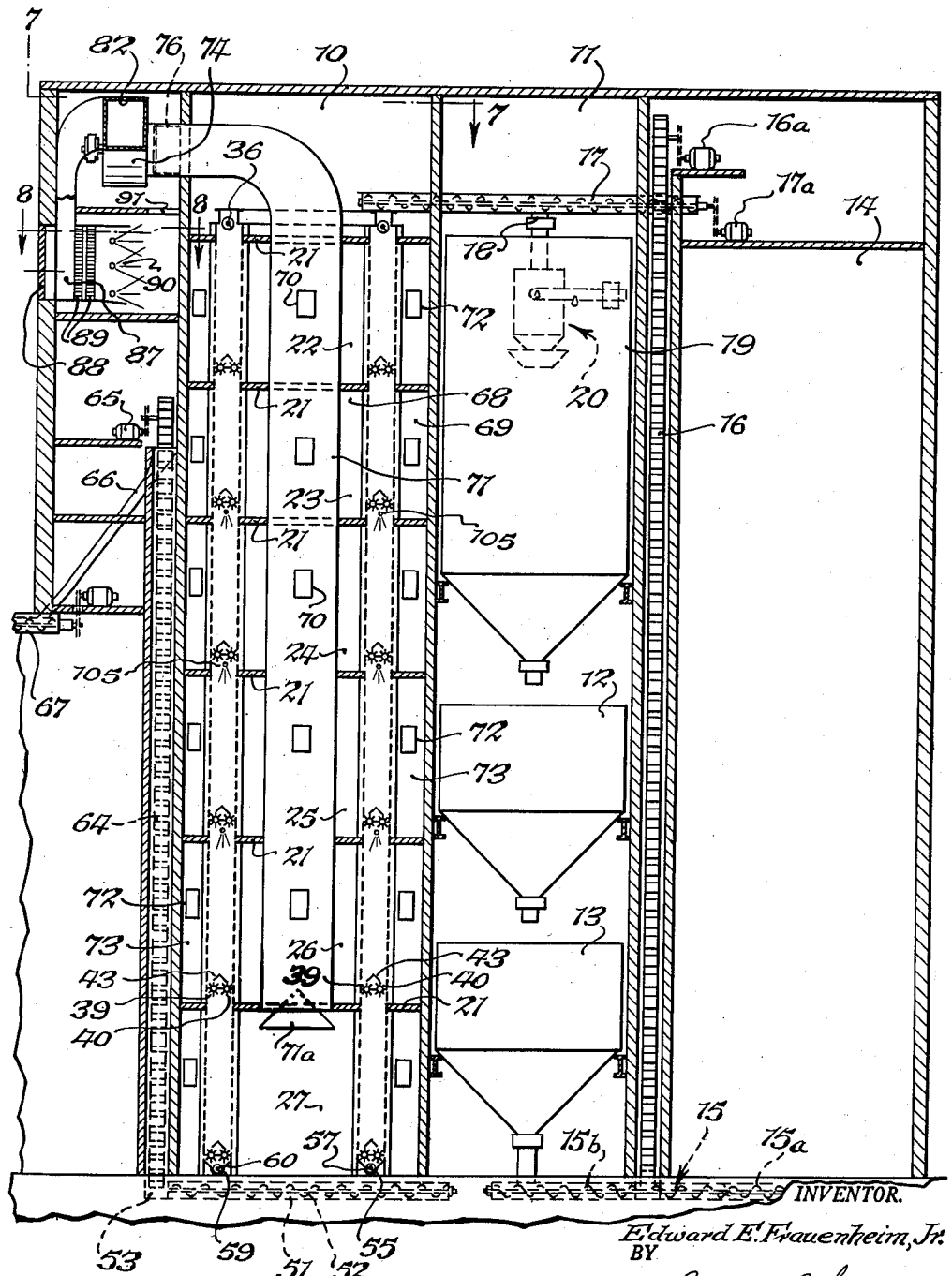
Figure 1 is a diagrammatic vertical section of malting apparatus employing the features of the invention.

The apparatus, as illustrated in Figure 1, includes a stack 10 in which germination of the grain is effected, a stack 11 in which the grain is first steeped in tanks 12 and 13, and a stack 14 which provides an elevator in which the grain to be malted is stored.

A screw conveyor 15, which is located under the stacks 11 and 14, has a right hand section 15a formed to carry grain from the storage elevator to a bucket elevator 16 which is driven by a motor 16a and which carries the grain from the screw conveyor 15 to a second screw conveyor 17, the latter being driven by a motor 17a. The screw conveyor 17 extends through the stack 11 and into the stack 10. It is operative, at will, to discharge grain through an outlet 18 in the bottom wall thereof into a storage compartment 19 in the stack 11. Grain entering the compartment 19 is preferably delivered to an automatic scale 20 so that measured amounts of dry grain may be discharged into the steep tank 12 and, after a predetermined period, be discharged from the latter into the tank 13.

Grain which has been steeped for the required period in the tanks 12 and 13 may be discharged from the latter into the left hand section 15b of the conveyor 15 which is formed to transfer such grain to the bucket conveyor 16. The grain delivered to the bucket conveyor 16 is transferred by the bucket conveyor to the screw conveyor 17 but in this instance is carried by the latter across the compartment 19 and is transferred to the stack 10 in which it is to be germinated.

The stack 10, as illustrated, is rectangular in cross section and is divided by transverse partitions 21 into compartments 22, 23, 24, 25, 26 and 27 which are arranged in a vertical series and in each of which the steeped grain is subjected to air of the desired temperature and moisture content for a predetermined period.

The invention contemplates aeration of the grain in the uppermost compartment 22 for a predetermined period after which it is transferred to the adjacent lower compartment and treated for a predetermined period, and so on compartment by compartment down through the apparatus. For example, the grain may be permitted to germinate for one day in each of the compartments 22—27, thereby providing a germinating period of six days, after which the grain may be delivered to suitable kilns for drying in accordance with conventional practice. The apparatus illustrated contemplates steeping of the grain, preliminary to its transfer to the germinating stack, for a period of two days. By the use of the two steep tanks 12 and 13 in the manner illustrated, the grain may be steeped one day in each of the tanks, thereby permitting the delivery each day of properly steeped grain to the uppermost compartment 22 in the stack 10.

The grain to be treated in the various germinating compartments is accommodated in four hollow columns 28, 29, 30 and 31 (Figures 1 and 4) which extend from the floor of the compartment 27 through the topmost partition of the compartment 22 and the inner and outer walls 32 of which are perforated.

Figure 3:
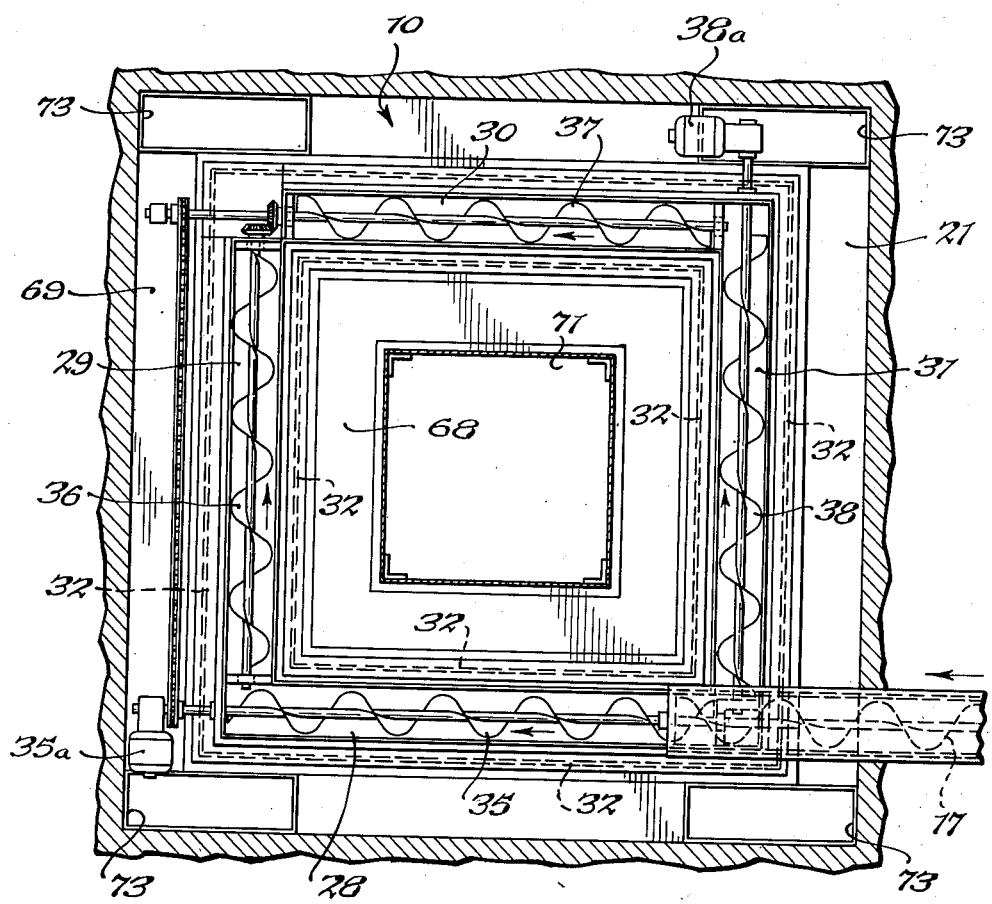
Figure 3 is a horizontal section taken along line 3—3 of Figure 2, the covers of the hollow columns being shown removed.

Referring to Figure 3, it will be noted that at their tops, the columns 28 and 31 communicate with one another to provide a common receiving space to which steeped grain may be delivered by the screw conveyor 17. Screw conveyors 35 and 36 carry grain from this space across the tops of the columns 28 and 29 while similar conveyors 37 and 38 carry grain from the same space across the tops of the columns 30 and 31. As illustrated, the conveyors 35, 36 and 37 are driven by a motor 35a while the conveyor 38 is driven by a motor 38a. As will be seen in Figure 3, grain will first be delivered to the top of columns 28 and 31; and as these columns fill with grain their respective screw conveyors 35 and 38 will carry the excess grain toward the columns 29 and 30. After columns 28 and 31 are filled, all of the grain from conveyor 17 is conveyed to the columns 29 and 30 by the screws 35 and 38 until these columns are completely filled, the screws 36 and 37 distributing the grain delivered to the columns 29 and 30.

Adjacent the partitions 21 at the bottom of each of the compartments 22—27, the columns 28, 29, 30 and 31 are provided with a valve arrangement or gate so as to close off the columns at such points and also provide means for permitting the transfer of grain from each column section to a lower column section.

Figure 2:
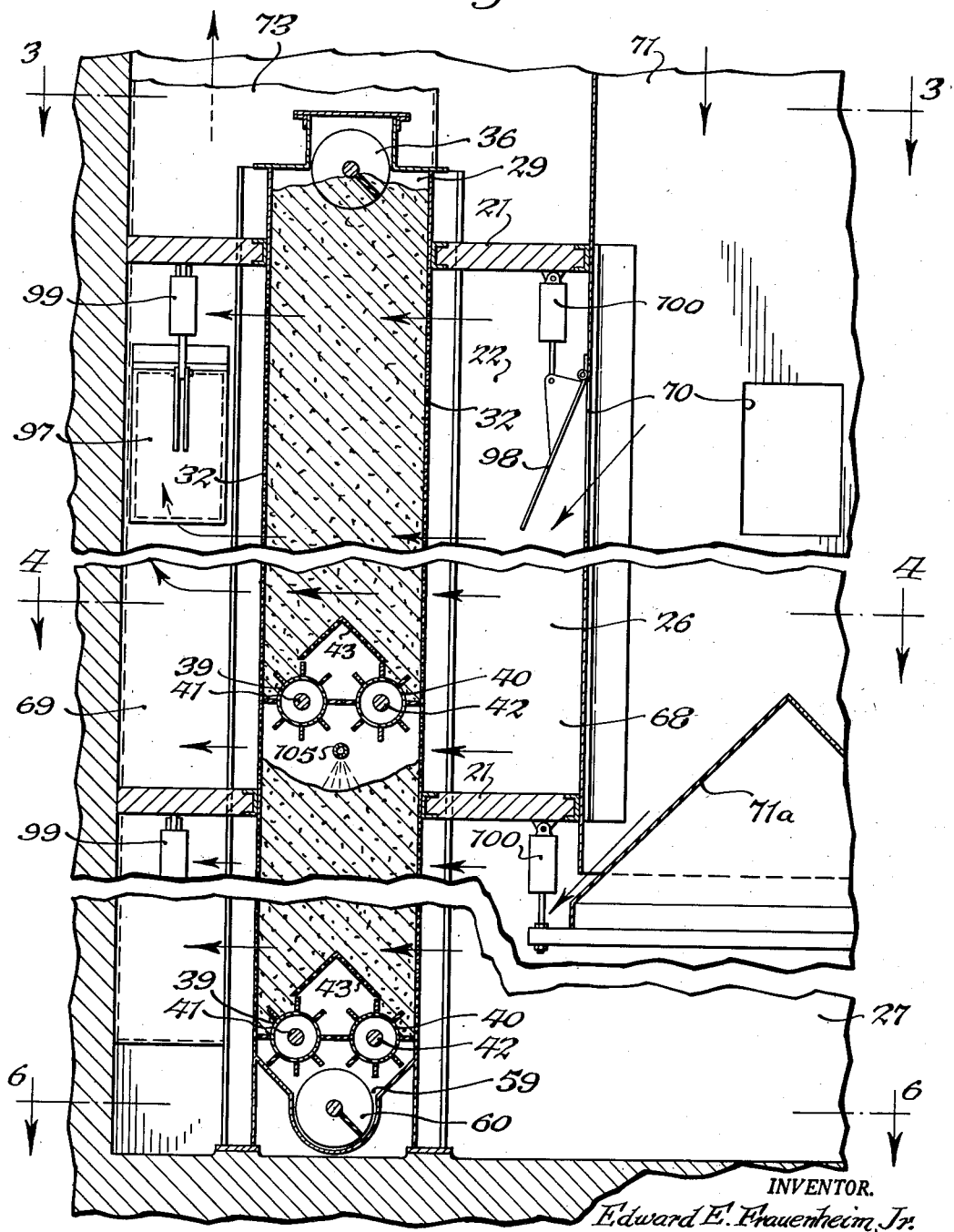
Figure 2 is an enlarged, fragmentary vertical section through the top, middle and bottom sections of one side of the apparatus.

Each valve arrangement or gate, as best shown in Figure 2, is provided by a pair of hollow longitudinally finned rolls 39 and 40 which are carried upon shafts 41 and 42, respectively. Peaked, perforated stationary baffles 43 are associated with each pair of finned rolls 39 and 40. The rolls are so related with respect to one another and with the inner and outer walls of the column and with the lower edges of the baffles 43 that when they are stationary and occupy the positions shown in Figure 2, they close off that section of the column above them so as to prevent passage of grain in the upper section to the adjacent lower section. It will be apparent, however, that by rotating the rolls 39 and 40 the grain in the column section above them will be permitted to flow by gravity to the adjacent lower column section.

Figure 4:
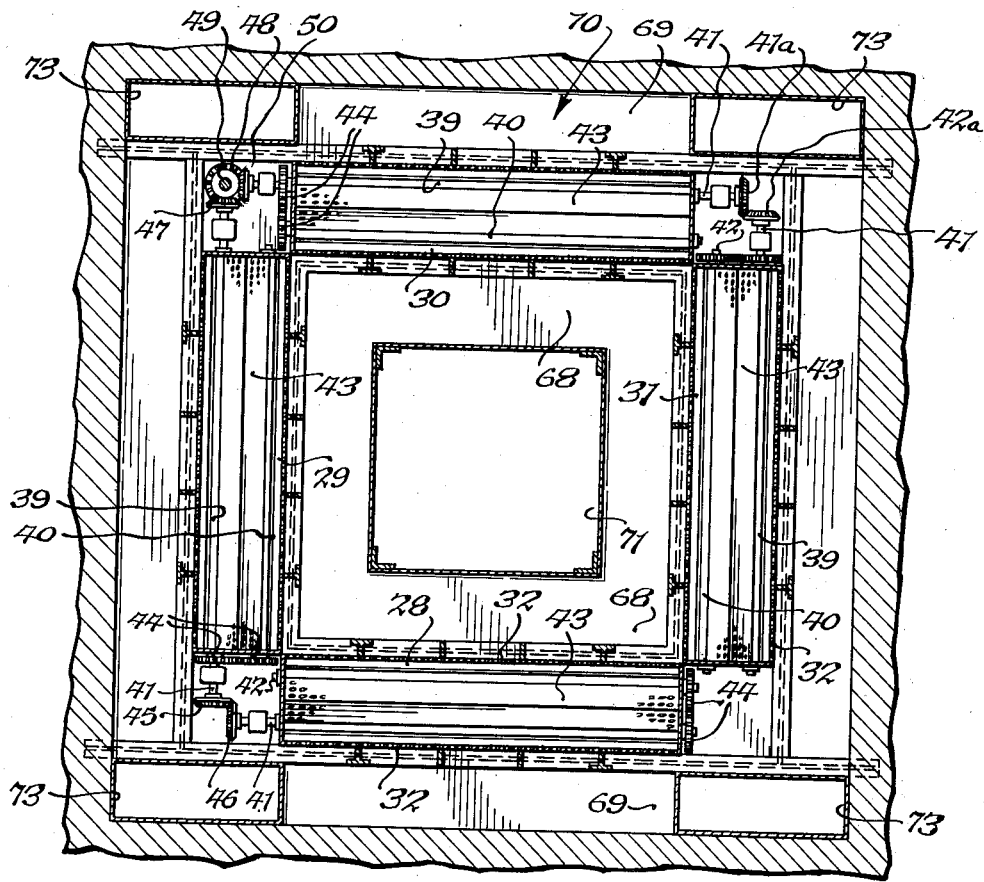
Figure 4 is a horizontal section taken along line 4—4 of Figure 2.
Figure 5:
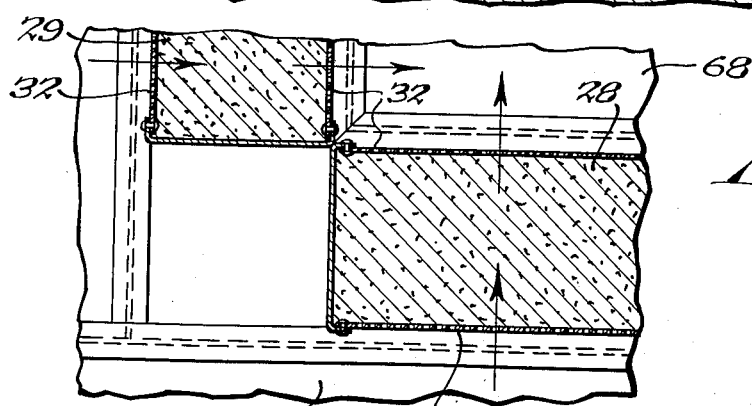
Figure 5 is an enlarged fragmentary horizontal section through one corner of the apparatus.

As shown in Figure 4, the shafts 41 and 42 of each pair of rolls may be connected by gears 44 so that they will turn in unison. The shafts 41 in the column 29 carry gears 45 at one end which mesh with gears 46 on the shafts 41 in the column 28. At their opposite ends, the shafts 41 in the column 29 carry gears 47 which mesh with gears 48 on a vertical drive shaft 49, which gears 48 also mesh with gears 50 on the adjacent ends of the shafts 41 extending through the column 30. The opposite ends of the last mentioned shafts 41 carry gears 41a which mesh with gears 42a on the adjacent ends of the shafts 41 which extend through the column 31. Rotation of the shaft 49, which may be accomplished in any suitable manner, will therefore be operative to turn all of the shafts 41 and 42 for controlling the rolls 39 and 40 in the manner contemplated.

Figure 6:
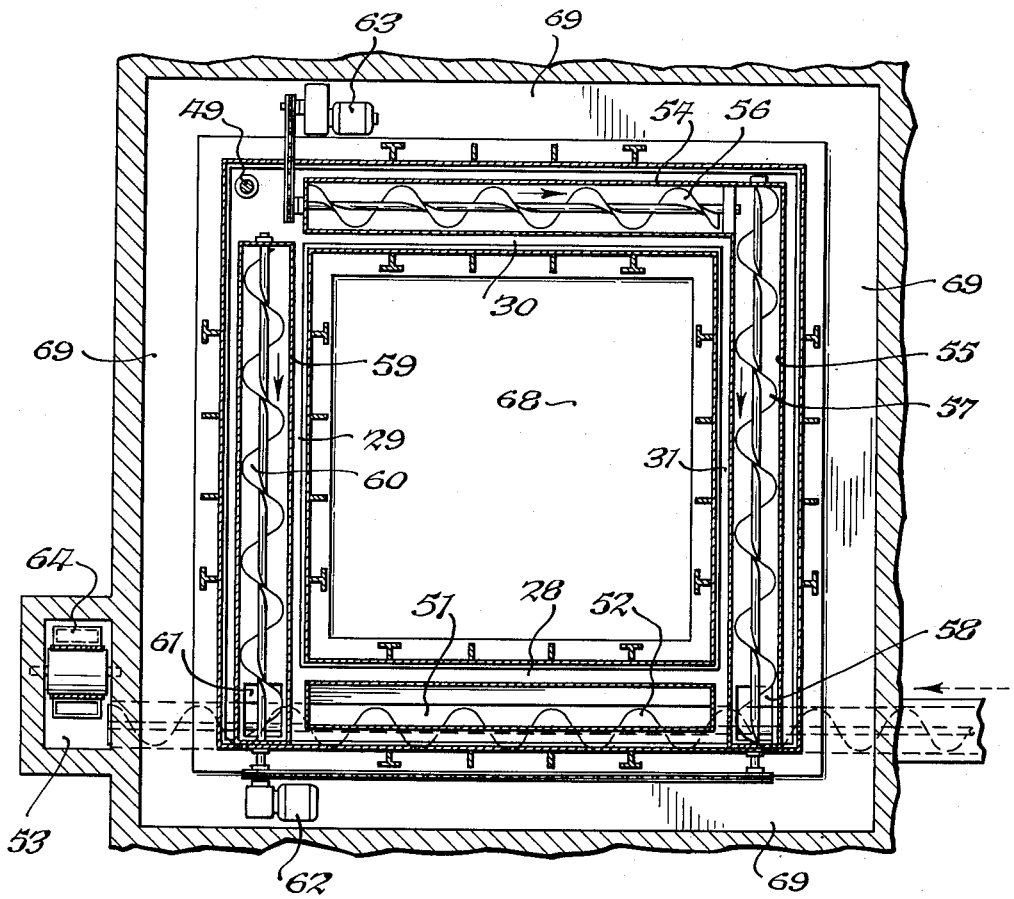
Figure 6 is a horizontal section taken along line 6—6 of Figure 2, and shows the conveyors for removing the germinated grain from the apparatus.

Assuming a six-day germinating period, the invention contemplates the operation of the valve arrangements at the bottoms of the column sections so that after the grain has occupied a column section for one day, it will be transferred to the adjacent lower section, passing through the stack section by section by gravity, as permitted by the various valve arrangements until reaching the bottom of the stack. The grain which is discharged from the lowermost section of the column 28 enters a trough 51 (Figure 1) and is conveyed through the trough by a screw conveyor 52 to a receiving chamber 53 (Figures 1 and 6). The grain which is discharged from the lowermost compartments of the columns 30 and 31 enters troughs 54 and 55 (Figure 6) and is conveyed by conveyors 56 and 57, respectively, to an outlet 58 through which the grain discharges into the trough 51. The grain which is discharged from the lowermost section of the column 29 enters a trough 59 and is conveyed therethrough by a conveyor 60 to an outlet 61 which also communicates with the trough 51. It will be noted that, as mentioned heretofore, the column 28 discharges directly into the trough 51. The conveyors 57 and 60 are driven by a suitable motor 62 while the conveyor 56 is driven by a motor 63.

The conveyor 52 thus transfers all of the grain discharged from the lowermost column sections to the receiving chamber 53. A bucket elevator 64 (Figure 1) which extends into the chamber 53 and which is driven by a motor 65 is operative to carry the grain from the chamber 53 to the top of a chute 66 down which it flows by gravity into a conveyor 67 which is adapted to transfer the grain to the kilns (not shown) in which it is to be dried.

It will be apparent that gravity is availed of to effect the transfer of the grain from each column section to the adjacent lower section and from the lowermost column sections to the conveyor which transfer it to the kilns. In the transfer of the grain from one column section to a lower column section the grain is turned so that the air treatment to which it is subjected will be varied from time to time. By causing the grain to flow through restricted passages at the bottoms of the column sections and by the use of finned rolls of the character described for closing off such bottom sections, the grain is not only turned as it passes from one column section to another but the fins of the rolls act to separate any grains which may have become matted or otherwise tend to adhere to one another.

As the steeped grain is permitted to move step-by-step through the compartments 22—27 in the manner described, air of a predetermined temperature and moisture content is caused to pass through it in order to promote grain growth. In this connection, it will be noted that the outer walls of the columns 28, 29, 30 and 31 are spaced from the inner walls of the stack 10 and that the columns are arranged in the form of a rectangle with the inner edges of adjacent columns connecting so that the inner and outer walls of the four columns cooperate with the transverse partitions to divide each of the compartments 22—27 into inner and outer chambers 68 and 69, respectively. The inner chambers 68 with the exception of the one in the lowermost compartment 27 communicate through ports 70 with a central, vertical duct 71 (Figures 1, 3 and 7) which extends through the inner chambers 68 in spaced relation with respect to the side walls of the columns 28, 29, 30 and 31. The duct 71 terminates at the lowermost partition 21 and its lower end communicates directly with the inner chamber of the lowermost compartment, there being a damper 71a for regulating the cross-sectional outlet area of the lower end of the duct 71. The outer chambers 69 communicate through ports 72 with vertical air ducts 73 which are located in the four corners of the stack 10.

As has been noted, the inner and outer walls of the columns 28, 29, 30 and 31 are foraminous to permit the passage of air horizontally through the columns to aerate the grain within the columns. The perforations in the inner and outer walls of the columns may be provided in any suitable manner, it being desirable, of course, that the perforations be of such a size that grain will be prevented from escaping from the columns through them. The inner and outer perforated walls of the columns 28, 29, 30 and 31 may be re-inforced against outward deflection, if desired, in any suitable manner.

The invention contemplates the passage of the aerating medium through the columns 28, 29, 30 and 31 either from the inner chambers 68 to the outer chambers 69 or from the outer chambers 69 to the inner chambers 68, or both.

Figure 9:
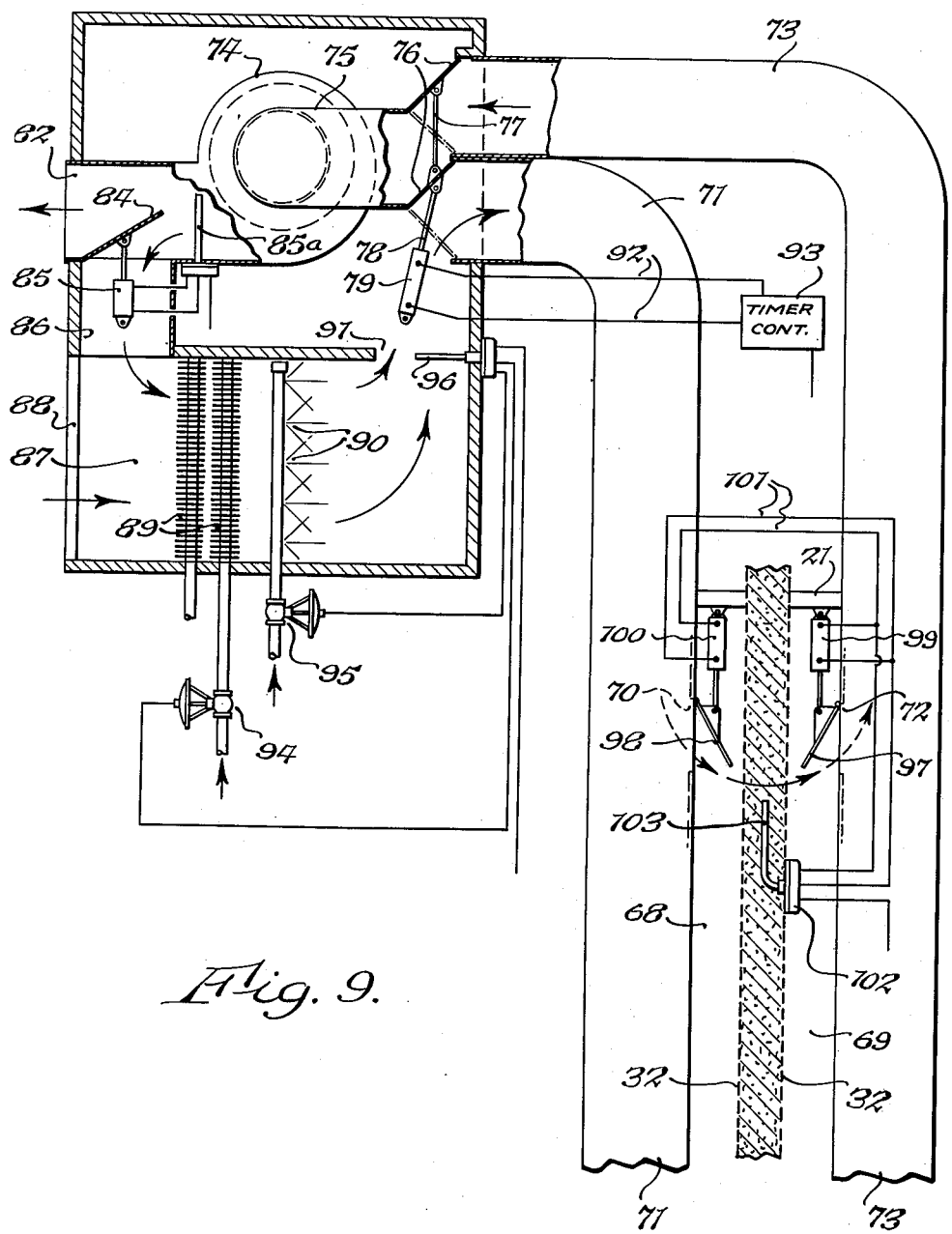
Figure 9 is a diagrammatic view illustrating the manner in which the air is caused to pass through the grain in the germinating zones and the various controls for conditioning the air and for regulating its flow.

For this purpose, a fan 74 is employed, the latter being preferably located above and at one side of the uppermost compartment 22 and having an inlet 75. The latter may be connected by a double-valve arrangement 76 (Figures 7 and 9) either to the outer ducts 73, as shown in full lines, or to the central duct 71 as shown in dotted lines. The valves 76 may be connected together by a link 77 for simultantous movement and a rod 78 which is connected to one of the valves may be actuated by a solenoid or any suitable motor 79 to move the valves to either of the operative positions described.

It will be apparent that in one position of the valves 76 air will be drawn through the central duct 71 while in the other position of the valves air will be drawn through the outer ducts 73. Provision is thus made for reversing the direction of the air through the grain columns.

Figure 7:
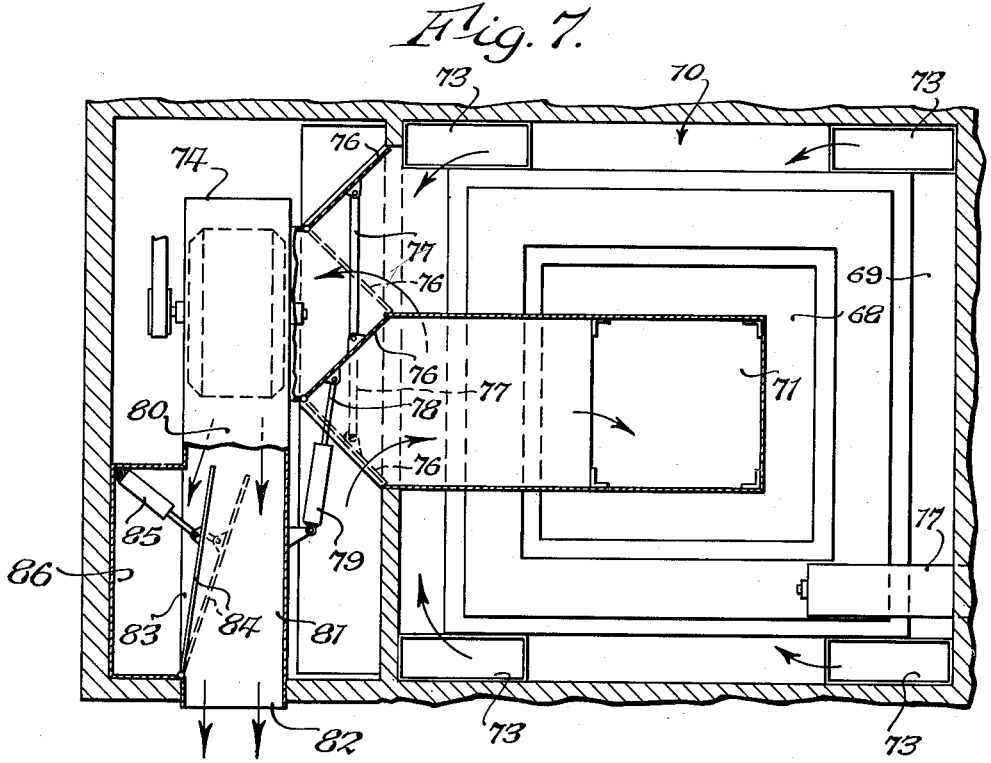
Figure 7 is a horizontal section taken along line 7—7 of Figure 1 and illustrates the valve arrangement for reversing the flow of air through the apparatus.
Figure 8:
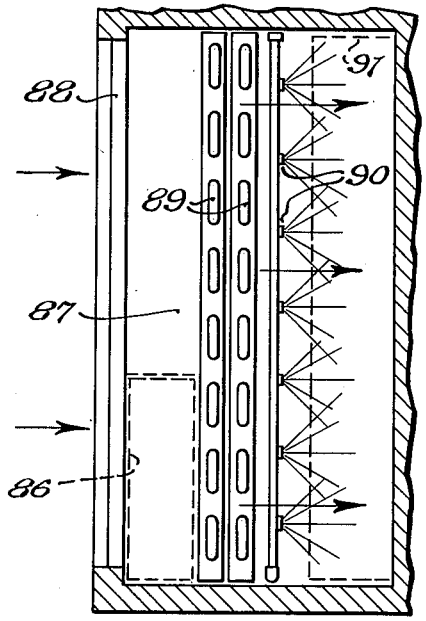
Figure 8 is a horizontal section through the attemperating chamber of the apparatus and is taken along line 8—8 of Figure 1.

Assuming the valves 76 to be in the full line positions shown in Figure 7, it will be apparent that as the fan is connected to withdraw air through the outer ducts 73, such air will flow from the inner chambers 68 through the columns 28, 29, 30 and 31 to the outer chambers 69 and from the latter through the ducts 73 to the intake of the fan 74, the withdrawn air in such case being supplied to the inner chambers 68 through the central duct 71. The outlet 80 (Figures 7 and 9) of the fan is connected to an extension 81 which communicates with the atmosphere through an outlet 82, there being a side outlet 83 controlled by a valve 84 (in turn controlled by a solenoid 85) so that all of the air leaving the fan outlet may escape to atmosphere or a predetermined portion thereof may be caused to enter a duct 86 which communicates with an attemperating zone 87 (Figures 8 and 9) having an inlet 88 through which fresh air is drawn. The amount of air which is recirculated may be controlled by a thermostatic element 85a (Figure 9) which is located in the outlet of the fan 74. Thereby, if desired, a portion of the air which has been caused to flow through the grain columns may be recirculated with the fresh air entering the inlet 88.

The air entering the attemperating zone in the manner described passes through units 89 which may be employed to add heat to the air and through water spray units 90 which may be employed to cool the air. The air which is treated in the attemperating zones leaves through an outlet 91 and enters the dust 71, assuming the valves 76 occupy the positions shown in full lines. This air discharges through the ports 70 and enters the chambers 68, passing through the grain columns to the outer chambers 69 and returning to the fan through the outer air ducts 73 in the manner described.

By reversing the valves 76 so they occupy the dotted line positions shown in Figure 7, the direction of the air through the grain columns may be reversed. Such reversal of the valves 76 will connect the inlet of the fan to the central air duct 71, thereby causing the aerating medium which leaves the attemperating zone to flow down through the outer ducts 73, such air being supplied to the outer chambers 69, being caused to flow through the grain columns to the inner chambers 68 and being returned through the inner duct 71 to the fan inlet.

If desired, the motor 79 which operates the valves 76 may be included in a circuit 92 (Figure 9) which may also include a timer 93, the latter being operative to reverse the valves 76 at predetermined intervals and in so doing reverse the direction of flow of the aerating medium through the grain columns.

The heating and cooling units 89 and 90 (Figure 9) may be controlled by valves 94 and 95, respectively, which valves may in turn be controlled by a thermostat element 96 located in the outlet 91 of the attemperating chamber. Thereby the temperature of the aerating medium may be accurately controlled in accordance with its temperature as it leaves the attemperating chamber.

Provision is made for regulating the amount of air caused to circulate through any section of the columns 28, 29, 30 and 31 in accordance with the temperature of the grain in such section. To this end, flap valves 97 (Figures 2 and 9) may be associated with each of the ports 72 in the outer air ducts 73 while similar flap valves 98 may be associated with the ports 70 and damper 71a in the central air duct 71. Solenoids 99 and 100 are connected respectively to said flap valves and are included in a circuit 101 which is energized and deenergized by a thermostatic switch 102. The temperature sensitive element 103 of the switch 102 is located between the inner and outer walls of the column section with which it is associated in such a manner as to be responsive to the temperature of the grain in such section. Consequently, the volume of air which is caused to circulate through each column section in each of the various germinating compartments may be regulated in accordance with the temperature of the grain in such column section.

Spray pipes 105 may be provided just under the valve rolls 39 and 40, as shown, in Figures 1 and 2, for the purpose of adding moisture to the grain when this is desirable.

From the foregoing, it will be apparent that the steeped grain will be subjected in each of the various compartments to the action of an aerating medium of a predetermined temperature and having a predetermined moisture content. The treatment received in each compartment is regulated and controlled in accordance with the condition of the grain in such compartment, the apparatus being so regulated that as the grain is discharged from the lowermost compartment, it has acquired the desired characteristics which attend its growth.

It will be noted that the columns 28, 29, 30 and 31 provide, in fact, a rectangular tube having inner and outer walls and through which the grain moves zone-by-zone by gravity to effect turning of the grain. While being aerated, the grain is supported in vertical columns and the aerating medium is caused to circulate horizontally through the columns in a direction transverse to the extent of the columns and the direction in which the grain moves through the columns.

The apparatus described has the advantage that it enables grain to be malted in a highly economical manner. Uniform aeration of the grain is also insured while plows and various other complicated mechanisms for turning the grain are eliminated.

The shape and arrangement of the columns through which the grain passes may be varied considerably. For example, the columns may be connected in various multi-sided arrangements; and, in fact, the inner and outer walls of the various columns illustrated could be provided, if desired, by inner and outer cylinders, or tubes. The form of the invention which has been illustrated, therefore, is intended by way of example only and not by way of limitation.

I claim as my invention:

1. Apparatus for malting grain including a vertical series of compartments, a plurality of vertical hollow columns extending through said compartments and being joined along adjacent vertical longitudinal edges, said columns having inner and outer foraminous walls which divide each of said compartments into a central chamber and an outer chamber, means in said columns for dividing the latter into sections having substantially the same vertical extent as said compartments, means for delivering grain to said columns at the uppermost of said compartments, means for actuating said first named means to enable said grain to move section-by-section downwardly through said columns by gravity to effect turning of the grain, and means communicating with said central and outer chambers for circulating an aerating medium through said sections by way of said walls.

2. Apparatus for malting grain including a vertical series of compartments, a plurality of vertical, hollow columns extending through said compartments and being joined along adjacent vertical longitudinal edges, said columns having inner and outer foraminous walls which divide each of said compartments into a central chamber and an outer chamber, means in said columns for dividing the latter into sections having substantially the same vertical extent as said compartments, means for delivering grain to said columns at the uppermost of said compartments, means for actuating said first named means at predetermined intervals to enable said grain to move section-by-section downwardly through said columns by gravity to effect turning of the grain, an air duct extending through and communicating with said central chambers, an air duct extending through and communicating with said outer chambers, and a fan for circulating an aerating medium through said sections by way of said walls, said ducts and said central and outer chambers.

3. A method of malting grain which includes supporting and guiding a body of grain so that it may move section-by-section by gravity through a vertical series of germinating sections in which different temperatures prevail, and circulating an aerating medium horizontally through said body of grain in each of said sections, and controlling the volume of the aerating medium flowing in each section by the temperature of the grain in that section to control the rate of germination in that section.

4. A method of malting grain which includes supporting and guiding a vertical column of grain so that it moves vertically section-by-section by gravity through a vertical series of sections, effecting turning of the grain as it passes from one section to another, circulating an aerating medium horizontally through said column of grain in each of said sections, and periodically reversing the flow of said aerating medium to maintain a substantially uniform rate of germination throughout each section.

5. Apparatus for malting grain comprising a tubular column divided into a plurality of sections arranged vertically one above the other and adapted to hold equal amounts of grain, a pair of rotary gates rotatably mounted at the bottom of each section for rotation on parallel axes, each of said gates having a plurality of generally radially-disposed fins around its periphery, a baffle fixedly mounted in each section above each pair of gates and cooperating with each pair of gates to close the bottom of a section, and means for rotating said gates to permit the grain to pass by gravity from one section to the next lower section and to turn the grain in such passage.

6. Apparatus for malting grain comprising a stack, a plurality of transverse partitions arranged in said stack and dividing said stack into a plurality of compartments disposed vertically one above another, a plurality of vertically disposed tubular columns extending through said partitions and spaced from the inside wall of said stack, said columns being so disposed as to enclose a space in each compartment constituting an inner central chamber and said columns being spaced from said stack to form with said stack a space in each compartment constituting an outer chamber, means including movable gates in each column for dividing said column into a vertical series of grain-holding sections having substantially the same vertical extent as said compartments and through which a body of grain is adapted to pass section-by-section by gravity, each section of each column having foraminous walls communicating with the outer and inner chambers, means communicating with the outer and inner chambers for circulating an aerating medium through said sections in either direction, and means for moving said gates to permit grain to drop from one section to the next lower section by gravity.

7. Apparatus for malting grain comprising a stack, a plurality of transverse partitions arranged in said stack and dividing said stack into a plurality of compartments disposed vertically one above another, a plurality of vertically disposed tubular columns extending through said partitions and spaced from the inside wall of said stack, said columns being so disposed as to enclose a space in each compartment constituting an inner central chamber and said columns being spaced from said stack to form with said stack a space in each compartment constituting an outer chamber, means including movable gates in each column for dividing said column into a vertical series of grain-holding sections having substantially the same vertical extent as said compartments and through which a body of grain is adapted to pass section-by-section by gravity, each section of each column having foraminous walls communicating with the outer and inner chambers, means communicating with the outer and inner chambers for circulating an aerating medium through said sections, means controlled by the temperature of the grain in each section for controlling the volume of said aerating medium circulating through that section, and means for moving said gates to permit grain to drop from one section to the next lower section by gravity.

8. Apparatus for malting grain comprising a stack, a plurality of transverse partitions arranged in said stack and dividing said stack into a plurality of compartments disposed vertically one above another, a plurality of vertically disposed tubular columns extending through said partitions and spaced from the inside wall of said stack, said columns being so disposed as to enclose a space in each compartment constituting an inner central chamber and forming said columns being spaced from said stack to form with said stack a space in each compartment constituting an outer chamber, means including movable gates in each column for dividing said column into a vertical series of grain-holding sections having substantially the same vertical extent as said compartments and through which a body of grain is adapted to pass section-by-section by gravity, each section of each column having foraminous walls communicating with the outer and inner chambers, an air duct extending vertically through said partitions through the inner chambers of said compartments and having openings communicating with said inner chambers, an air duct extending vertically through said partitions and through the outer chambers and having openings communicating with the outer chambers, means for circulating an aerating medium through said ducts, said openings, and said sections in either direction, and means for moving said gates to permit grain to drop from one section to another.

9. Apparatus for malting grain comprising a stack, a plurality of transverse partitions arranged in said stack and dividing said stack into a plurality of compartments disposed vertically one above another, a plurality of vertically disposed tubular columns extending through said partitions and spaced from the inside wall of said stack, said columns being so disposed as to enclose a space in each compartment constituting an inner central chamber and said column being spaced from said stack to form with said stack a space in each compartment constituting an outer chamber, means including movable gates in each column for dividing said column into a vertical series of grain-holding sections having substantially the same vertical extent as said compartments and through which a body of grain is adapted to pass section-by-section by gravity, each section of each column having foraminous walls communicating with the outer and inner chambers, an air duct extending vertically through said partitions through the inner chambers of said compartments and having ports communicating with said inner chambers, an air duct extending vertically through said partitions through the outer chambers and having ports communicating with said outer chambers, movable flaps for controlling the openings of said ports, means for circulating an aerating medium through said sections by way of said ducts and ports and said outer and inner chambers, means controlled by the temperature of the grain in each column section for controlling the positions of said flaps, and means for moving said gates to permit grain to drop from one section to the next lower section.

10. Apparatus for malting grain comprising a stack, a plurality of transverse partitions arranged in said stack and dividing said stack into a plurality of compartments disposed vertically one above another, a plurality of vertically disposed tubular columns extending through said partitions and spaced from the inside wall of said stack, said columns being so disposed as to enclose a space in each compartment constituting an inner central chamber and said columns being spaced from said stack to form with said stack a space in each compartment constituting an outer chamber, means including movable gates in each column for dividing said column into a vertical series of grain-holding sections having substantially the same vertical extent as said compartments and through which a body of grain is adapted to pass section-by-section by gravity, each section of each column having foraminous walls communicating with the outer and inner chambers, an air duct extending vertically through said partitions through the inner chambers of said compartments and having ports communicating with said inner chambers, an air duct extending vertically through said partitions through the outer chambers and having ports for communicating with said outer chambers, movable flaps for controlling the openings of the ports of one of said ducts, at least, means for circulating an aerating medium through the column sections by way of said ducts and ports and said outer and inner chambers, means controlled by the temperature of the grain in each column section for controlling the positions of the flaps that control the openings of the ports associated with that section, and means for moving said gates to permit grain to drop from one section to the next lower section.

11. Apparatus for malting grain comprising a vertical stack, a plurality of horizontal partitions dividing said stack into a plurality of compartments disposed vertically one above another, a plurality of vertically-disposed tubular columns extending through said partitions and spaced from the inside wall of said stack, said columns being so disposed as to enclose a space in each compartment constituting an inner central chamber and said columns forming with said stack a space in each compartment constituting an outer chamber, a plurality of vertically-spaced gates in each column for dividing each column into a plurality of grain-receiving sections having substantially the same vertical extent as said compartments, each section of each column having foraminous vertical walls, an air duct extending vertically through said partitions through the inner chambers of said compartments and having openings communicating with said inner chambers, means for conducting air vertically through said partitions through the outer chambers, means for circulating an aerating medium through said sections by way of said duct, said conducting means and said inner and outer chambers, means for periodically reversing the direction of flow of said medium, and means for opening said gates to permit grain to pass by gravity from one section to the next lower section.

12. Apparatus for malting grain comprising a vertical stack, a plurality of horizontal partitions dividing said stack into a plurality of compartments disposed vertically one above another, a plurality of vertically-disposed tubular columns extending through said partitions and spaced from the inside wall of said stack, said columns being so disposed as to enclose a space in each compartment constituting an inner central chamber and said columns forming with said stack a space in each compartment constituting an outer chamber, a plurality of vertically-spaced gates in each column for dividing each column into a plurality of sections having substantially the same vertical extent as said compartments, each section of each column having foraminous walls, an air duct extending vertically through said partitions through the inner chambers of said compartments and having ports communicating with said inner chambers, means for conducting air vertically through said partitions through the outer chambers, a movable flap controlling the opening of each port in said duct, means for circulating an aerating medium through said sections by way of said ducts, said conducting means, and said inner and outer chambers, means for periodically reversing the direction of flow of said medium, means controlled by the temperature of the grain in each column section for controlling the positions of the flap that is associated with that section, and means for opening said gates to permit grain to pass by gravity from one section to the next lower section.

13. Apparatus for malting grain comprising three vertical stacks in a first of which grain is stored, in a second of which grain is steeped, and in the third of which grain is germinated, a horizontally disposed conveyor communicating with the first and second stacks at the bottoms thereof and arranged to receive grain from either stack, a vertical conveyor disposed and constructed to carry grain from said horizontally disposed conveyor to a height above the second stack, a horizontal conveyor disposed to receive grain from the second conveyor and to carry it over the tops of the second and third stacks, means operable to discharge grain selectively from the last-named conveyor into the second or the third stack, a steeping tank disposed in said second stack above said first horizontally disposed conveyor so that said tank may discharge grain by gravity into said first horizontally disposed conveyor, a plurality of movable gates in the third stack dividing said third stack into a plurality of grain-containing sections disposed vertically one above another, means for circulating an aerating medium through said sections, means for opening said gates to discharge grain from one section to the next lower section, and means for conveying away grain discharged from the lowermost section.

14. Apparatus for malting grain comprising three vertical stacks in a first of which grain is stored, in a second of which grain is steeped, and in the third of which grain is germinated, a horizontally disposed conveyor communicating with the first and second stacks at the bottoms thereof and arranged to receive grain from either stack, a second conveyor disposed and constructed to carry grain from said horizontally disposed conveyor to a third height above the second stack, a conveyor disposed to receive grain from the second conveyor and to carry it over the tops of the second and third stacks, means operable to discharge grain selectively from the last-named conveyor into the second or the third stack, a plurality of steeping tanks disposed vertically one above another in said second stack so that an upper steeping tank may discharge grain by gravity into a lower steeping tank, a plurality of movable gates in the third stack dividing said third stack into a plurality of grain-containing sections disposed vertically one above another, means for circulating an aerating medium through said sections, means for reversing the flow of said medium periodically, means for opening said gates to discharge grain from one section to the next lower section by gravity, and means for conveying away grain discharged from the lowermost section.

15. Apparatus for malting grain comprising three vertical stacks in a first of which grain is stored, in a second of which grain is steeped, and in the third of which grain is germinated, a horizontally disposed conveyor communicating with the first and second stacks at the bottoms thereof and arranged to receive grain from either stack, a second conveyor disposed and constructed to carry grain from said horizontally disposed conveyor to a height above the second stack, a third conveyor disposed to receive grain from the second conveyor and to carry it over the tops of second and third stacks, means operable to discharge grain selectively from the last-named conveyor into the second or the third stack, a plurality of steeping tanks disposed vertically one above another in said second stack so that an upper steeping tank may discharge grain by gravity into a lower steeping tank, a plurality of moveable gates in the third stack dividing said third stack into a plurality of grain-containing sections disposed vertically one above another, means for circulating an aerating medium through said sections, means for reversing the flow of said medium periodically, means controlled by the temperature of the grain in a section for controlling the volume of said medium circulating in said section, means for opening said gates to discharge grain from one section to the next lower section by gravity, and means for conveying away grain discharged from the lowermost section.

16. Apparatus for malting grain comprising a vertical stack, a plurality of horizontal partitions dividing said stack into a plurality of compartments disposed vertically one above another, a plurality of vertically-disposed tubular columns extending through said partitions and spaced from the inside wall of said stack, said columns being so disposed as to enclose a space in each compartment constituting an inner chamber and said columns forming with said stack a space in each compartment constituting an outer chamber, a plurality of vertically-spaced gates in each column for dividing each column into a plurality of grain-receiving sections having substantially the same vertical extent as said compartments, each section of each column having foraminous vertical walls, an air duct extending vertically through said partitions through said inner chambers and having ports communicating with said inner chambers, an air duct extending vertically through said partitions through the outer chambers and having ports communicating with said outer chambers, a fan for circulating an aerating medium through said ducts, a pair of shiftable valves connecting the two ducts with said fan, means for simultaneously shifting said valves to reverse the flow of air in said ducts, and means for opening said gates to permit grain to drop from one section into the next lower section.

17. Apparatus for malting grain comprising a vertical stack, a plurality of horizontal partitions dividing said stack into a plurality of compartments disposed vertically one above another, a plurality of vertically-disposed tubular columns extending through said partitions and spaced from the inside wall of said stack, said columns being so disposed as to enclose a space in each compartment constituting an inner chamber and said columns forming with said stack a space in each compartment constituting an outer chamber, a plurality of vertically-spaced gates in each column for dividing each column into a plurality of grain-receiving sections having substantially the same vertical extent as said compartments, each section of each column having foraminous vertical walls, an air duct extending vertically through said partitions through said inner chambers and having ports communicating with said inner chambers, an air duct extending vertically through said partitions through the outer chambers and having ports communicating with said outer chambers, a fan for circulating an aerating medium through said ducts, a pair of shiftable valves connecting the two ducts with said fan, means for simultaneously shifting said valves periodically to reverse the flow of air in said ducts, and means for opening said gates to permit grain to drop from one section to the next lower section.

18. Apparatus for malting grain comprising three vertical stacks in a first of which grain is stored, in a second of which grain is steeped, and in the third of which grain is germinated, a horizontally disposed conveyor communicating with the first and second stacks at the bottoms thereof and arranged to receive grain from either stack, a vertical conveyor disposed and constructed to carry grain from said horizontal conveyor to a height above the second stack, a horizontal conveyor disposed to receive grain from the vertical conveyor and to carry it over the tops of the second and third stacks, means operable to discharge grain selectively from the last-named conveyor into the second or the third stacks, a steeping tank disposed vertically in said second stack to receive grain discharged into said second stack and to discharge grain by gravity into the first horizontal conveyor, a plurality of movable gates in the third stack dividing said third stack into a plurality of grain-receiving sections disposed vertically one above another, means for circulating an aerating medium through each section, means for opening said gates to discharge grain from one section to the next lower section, and means for conveying away grain discharged from the lowermost section.

19. Apparatus for malting grain comprising a centrally-disposed, vertically-extending air duct, spaced, vertically-extending foraminous walls surrounding said air duct and disposed one outside the other, a second air duct disposed outwardly of the foraminous walls, means for dividing the space between said foraminous walls into a vertical series of germinating sections through which a body of grain is adapted to pass section-by-section, valves disposed in the two air ducts in registry with different germinating sections to permit circulation of an aerating medium between said ducts through said different germinating sections, and means including said valves for circulating an aerating medium through said different germinating sections and said ducts.

20. Apparatus for malting grain comprising a centrally-disposed, vertical-extending air duct, spaced, vertically-extending foraminous walls surrounding said air duct and disposed one outside the other, a second air duct disposed outwardly of the foraminous walls, means for dividing the space between said foraminous walls into a vertical series of germinating sections through which a body of grain is adapted to pass section-by-section, valves disposed in the two air ducts in registry with different germinating sections to permit circulation of an aerating medium between said ducts through said different germinating sections, said valves being adjustable to control the flow of air in different germinating sections, and means including said valves for circulating an aerating medium in opposite directions through said different germinating sections and said ducts.

21. Apparatus for malting grain comprising a centrally-disposed, vertically-extending air duct, spaced, vertically-extending foraminous walls surrounding said air duct and disposed one outside the other, a second air duct disposed outwardly of the foraminous walls, means for dividing the space between said foraminous walls into a vertical series of germinating sections through which a body of grain is adapted to pass section-by-section, valves disposed in the two air ducts in registry with different germinating sections to permit circulation of an aerating medium between said ducts through said different germinating sections, said valves being adjustable to control the flow of air in different germinating sections, and means including said valves for circulating an aerating medium in opposite directions alternately through said different germinating sections and said ducts.

22. Apparatus for malting grain comprising a centrally-disposed, vertically-extending air duct, spaced, vertically-extending foraminous walls surrounding said air duct and disposed one outside the other, a second air duct disposed outwardly of the foraminous walls, means for dividing the space between said foraminous walls into a vertical series of germinating sections through which a body of grain is adapted to pass section-by-section, valves disposed in the two air ducts in registry with different germinating sections to permit circulation of an aerating medium between said ducts through said different germinating sections, said valves being adjustable to control the flow of air in different germinating sections, means including said valves for circulating an aerating medium through said different sections, and means controlled by the temperature of the grain in each germinating section for adjusting the openings of the valves in registry with that germinating section.

23. Apparatus for malting grain including foraminous walled means for supporting a body of grain, means for circulating an aerating medium through said supporting means, and thermally-responsive means adapted to be inserted in said body of grain and operatively connected to said circulating means to control the circulation of the aerating medium through said body of grain.

24. Apparatus for malting grain including foraminous walled means for supporting a body of grain, a pair of air ducts at opposite sides of said means, an adjustable valve in each duct controlling flow of air from one duct and flow of air into the other, means including said ducts and valves for circulating an aerating medium through said foraminous-walled means and through the body of grain supported thereby, and thermally-responsive means adapted to be inserted in said body of grain and operatively connected to said valves vary the opening of the same in accordance with the temperature of said body of grain, thereby to control the circulation of the aerating medium through said body of grain.

25. Apparatus for malting grain comprising a vertical series of germinating sections through which a body of grain is adapted to pass section-by-section, means including movable gates for separating one section from another, said gates being movable to permit movement of the grain from one section to the next lower section by gravity, means for circulating an aerating medium through each section, and means controlled by the temperature of grain in each section for controlling the circulation of the aerating medium in that section.

EDWARD E. FRAUENHEIM, Jr.

References Cited in the file of this patent

UNITED STATES PATENTS

| Number | Name | Date |
|---|---|---|
| 340,642 | Volkner | Apr. 27, 1886 |
| 437,950 | Toepfer | Oct. 7, 1890 |
| 672,843 | Renner | Apr. 23, 1901 |
| 826,886 | Rice | July 24, 1906 |
| 915,968 | Kirkpatric | Mar. 23, 1909 |
| 1,041,282 | Heuser | Oct. 15, 1912 |
| 1,176,297 | Kirkpatric | Mar. 21, 1916 |
| 1,408,457 | Harrison | Mar. 7, 1922 |
| 1,424,565 | Goskar | Aug. 1, 1922 |

FOREIGN PATENTS

| Number | Country | Date |
|---|---|---|
| 43,655 | Germany | 1888 |